United States Patent
Bauer et al.

(10) Patent No.: US 6,665,596 B2
(45) Date of Patent: Dec. 16, 2003

(54) VEHICLE CONTROL SYSTEM AND METHOD FOR CONTROLLING A VEHICLE

(75) Inventors: Wolf-Dietrich Bauer, Stuttgart (DE);
Carsten Hämmerling, Stuttgart (DE);
Albert Kirchmann, Osifildern (DE);
Andreas Schwarzhaupt, Oberrot (DE);
Gernot Spiegelberg, Heimsheim (DE);
Wolfgang Stahl, Oberboihingen (DE);
Udo Weitze, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/069,938
(22) PCT Filed: Jun. 2, 2001
(86) PCT No.: PCT/EP01/06307
§ 371 (c)(1),
(2), (4) Date: Jul. 8, 2002
(87) PCT Pub. No.: WO02/02366
PCT Pub. Date: Jan. 10, 2002

(65) Prior Publication Data
US 2003/0120401 A1 Jun. 26, 2003

(30) Foreign Application Priority Data
Jul. 1, 2000 (DE) .......................... 100 32 179

(51) Int. Cl.$^7$ .................. B60K 41/28; B60R 16/02
(52) U.S. Cl. ................................ 701/33; 701/48
(58) Field of Search .................. 701/33, 36, 48, 701/23

(56) References Cited

U.S. PATENT DOCUMENTS
6,038,505 A  3/2000  Probst et al.

FOREIGN PATENT DOCUMENTS

| DE | 4039005 | 6/1991 |
|---|---|---|
| DE | 4111023 | 10/1994 |
| DE | 19838333 | 3/2000 |
| DE | 19709318 | 7/2000 |
| DE | 19709319 | 11/2000 |
| DE | 19838336 | 1/2002 |
| EP | 0754611 | 1/2000 |
| WO | 99/01320 | 1/1999 |

Primary Examiner—Michael J. Zanelli
(74) Attorney, Agent, or Firm—Crowell & Moring LLP

(57) ABSTRACT

A control system for a vehicle having a plurality of signal processing levels and actuators, in particular for brake, steering, engine and gearbox, for converting actuation signals and a method for controlling a vehicle. The system employs the following levels: an input level for continuous stipulations or an input level for discrete stipulations and an automation level for generating setpoint value signals, a predictive level and/or a reactive level for correcting the setpoint value signals, a coordination level for converting the set point value signals into actuation signals, and an execution level with the actuators. The actuators are connected to one another and to the coordination level by a fault-tolerant, redundant and bidirectional databus. Measures for redundant signal processing are taken, and data is transmitted in a fault-tolerant, redundant and bidirectional fashion.

8 Claims, 2 Drawing Sheets

VEHICLE CONTROL SYSTEM AND METHOD FOR CONTROLLING A VEHICLE

BACKGROUND AND SUMMARY OF THE INVENTION

This application claims the priority of Germany Application No. 100 32 179.8, filed Jul. 1, 2000 and PCT International Application No. PCT/EP01/06307, filed Jun. 2, 2001, the disclosures of which are expressly incorporated by reference herein.

The invention relates to a control system for a vehicle having a plurality of signal processing levels and actuators, in particular for brake, steering, engine and gearbox, for converting actuation signals, and to a method for controlling a vehicle.

Control systems of the generic type for vehicles are also referred to as drive-by-wire systems or x-by-wire systems. In such systems, the steering, brake and drive of a vehicle are controlled electronically without a continuous mechanical connection between the steering wheel and the steered wheels or without a continuous mechanical or hydraulic connection between the brake pedal and the service brake for the wheels.

The German laid-open application DE 41 11 023 A1 discloses a control system for a vehicle which is constructed in hierarchy levels run through in a predefined sequence during the processing of signals. The processing of signals for steering, wheel drive and chassis is carried out separately as a result the signal processing path branches in the lower hierarchy levels resulting in a complex structure of the control system. There is no provision for a safety system which allows for the possible failure of components.

In the vehicle control system described in German patent DE 40 39 005 C2, in order to ensure the operational capability of the system there is provision that, in addition to a connection of an operator control element to a central control unit and to an actuator with a subcontroller via a databus, there is an additional, direct connection between the operator control element and the actuator with the subcontroller. Thus, there are two differently structured cabling arrangements of the system present at the same time.

The European laid-open application EP 0 754 611 A1 discloses a braking and steering system for a vehicle in which an attempt is made to ensure operational reliability with fault tolerance and redundancy devices when components fail. Fault tolerance is the term used to describe the capability of a system to fulfil its specific function even with a limited number of faulty subsystems. Redundancy is the term used to refer to the presence of more means than are necessary for the execution of the envisaged tasks per se.

The invention provides a safe and reliable control system with a comparatively simple structure, and a reliable and safe method for controlling a vehicle.

According to the invention, a control system for a vehicle is provided with a plurality of signal processing levels and actuators, in particular for brake, steering, engine and gearbox, for converting actuation signals, in which the following signal processing levels are provided: an input level with devices for inputting continuous stipulations of a driver and for converting the stipulations into setpoint value signals, or an input level with devices for inputting discrete stipulations of a driving system and an automation level with first signal processing modules for converting the stipulations of the input level into setpoint value signals; a predictive level with second signal processing modules for correcting the setpoint value signals with reference to a prediction of driving states and/or a reactive level with third signal processing modules for correcting the setpoint value signals with reference to current driving states; a coordination level with fourth signal processing modules for converting the setpoint value signals into actuation signals; and an execution level with the actuators for converting the actuation signals, the actuators being connected by means of a fault-tolerant, redundant and bidirectional databus, the first, second, third and/or fourth signal processing modules being configured for redundant signal processing and devices for fault-tolerant, redundant and bidirectional transmission of data being provided between two successive signal processing levels.

As a result of these features, a control system with a simple, modular structure is provided, in which individual signal processing levels, for example the predictive level, can be omitted if their functionality is not required without sacrificing the underlying structure of the control system. As a result, in comparison to previous control systems, an extremely flexible control system is provided. The provision of a coordination level for converting the setpoint value signals into actuation signals provides a defined interface whereby the levels in which the original stipulations are processed are decoupled from the levels in which the processed stipulations are executed. Such a defined interface simplifies the structure and makes changes and expansions of the control system considerably easier. Moreover, a high degree of protection against failure of the control system is provided by redundant signal processing and fault-tolerant and redundant transmission of data. The bidirectional processing of data between successive signal processing levels, i.e. also between the actuators and the coordination level, permits setpoint value signals to be transmitted and actual value signals and diagnostic value signals to be fed back.

According to one aspect of the invention, the reactive level is arranged between the coordination level and the execution level. As a result, the actuation signals for the actuators are corrected with reference to current driving states. This can be advantageous for a rapid reaction to critical driving states because the actuation signals for the actuators are corrected immediately.

At least one actuator is advantageously directly assigned a reactive signal processing module for reacting to critical, current driving states. This embodiment of the invention is also advantageous in terms of a rapid reaction to critical driving states. For example, an anti-lock brake system can thus be assigned directly to the wheel brake.

In another aspect devices are provided for supplying power for all the signal processing levels to be embodied redundantly. This measure contributes to a considerably increased protection of the control system against failure.

It is also advantageous for the bidirectional transmission of data to be embodied as optical waveguides. Optical waveguides permit a high-speed transmission of data which is comparatively independent of external disruptive influences.

In a further development of the invention, at least two physically separate first, second, third and fourth signal processing modules for redundant signal processing are provided in each of the automation level, the predictive level, the reactive level and the coordination level. Such hardware redundancy improves the reliability of the control system.

As a further development measure software is provided in the first, second, third and fourth signal processing modules to be embodied redundantly. As a result, the reliability of the control system is improved further.

The invention also proposes a method for controlling a vehicle, in particular its brake, steering, engine and gearbox, which has the following steps: inputting of continuous stipulations of a driver or discrete stipulations of a driving system and conversion of the stipulations into setpoint value signals; correction of the setpoint value signals with reference to a prediction of driving states and/or correction of the setpoint value signals with reference to current driving states; conversion of the setpoint value signals into actuation signals and execution of the actuation signals by actuators, the actuation signals being transmitted to the actuators, and actual value signals and diagnostic signals being transmitted by the actuators via a databus in a fault-tolerant and redundant fashion, the conversion of the stipulations into setpoint value signals, the correction of the setpoint value signals and the conversion of the setpoint value signals into actuation signals being carried out in a redundant fashion and setpoint value signals, actual value signals and diagnostic signals being transmitted on common data lines in a fault-tolerant, redundant and bidirectional fashion.

BRIEF DESCRIPTION OF THE DRAWINGS

Further features and advantages of the invention emerge from the following description in conjunction with the appended drawings, in which.

DETAILED DESCRIPTION OF THE PREFERRED EMBOIDMENTS

Figure 1:
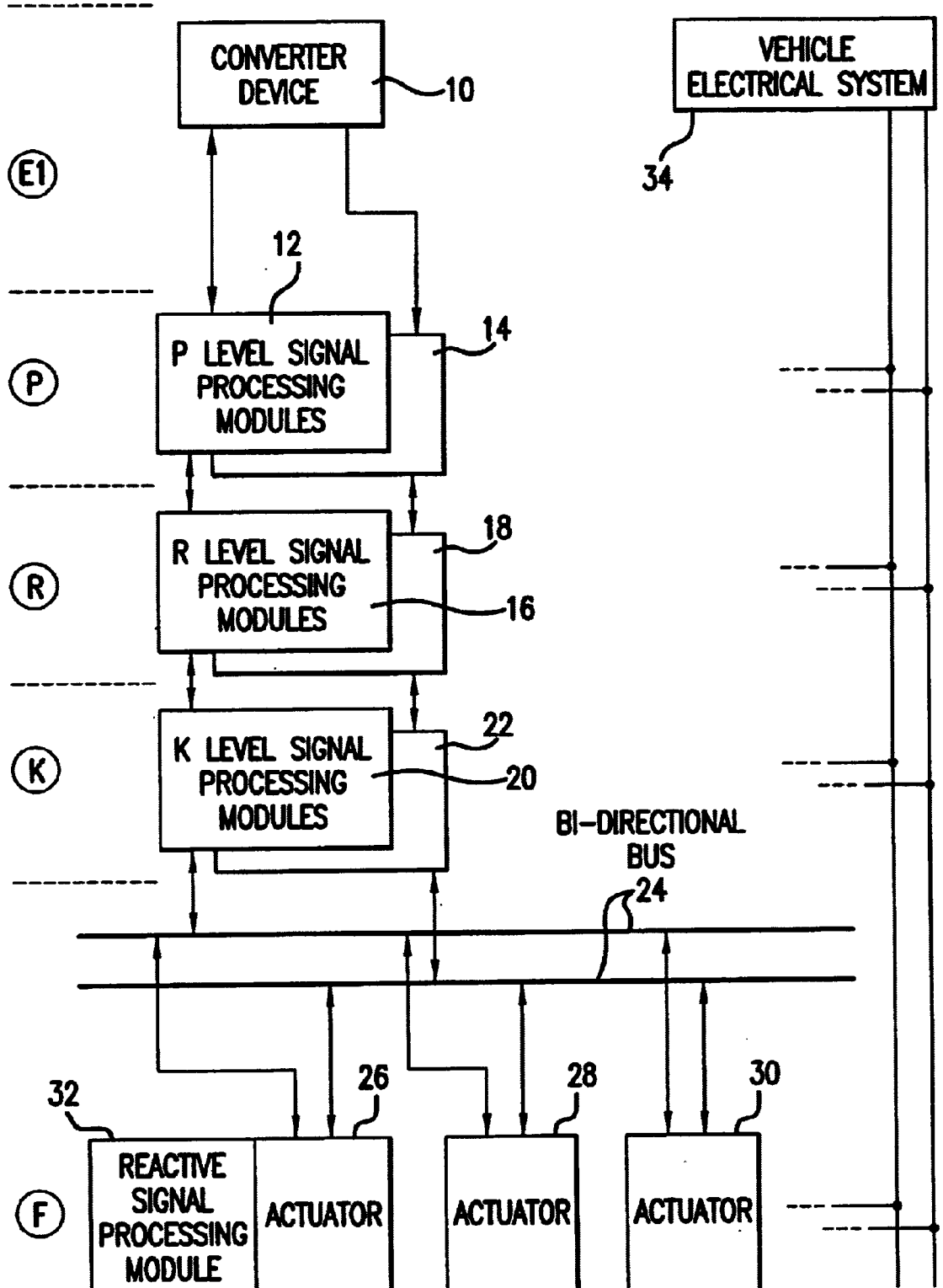
FIG. 1 shows a schematic view of a control system according to the invention in accordance with a first embodiment.
Figure 2:
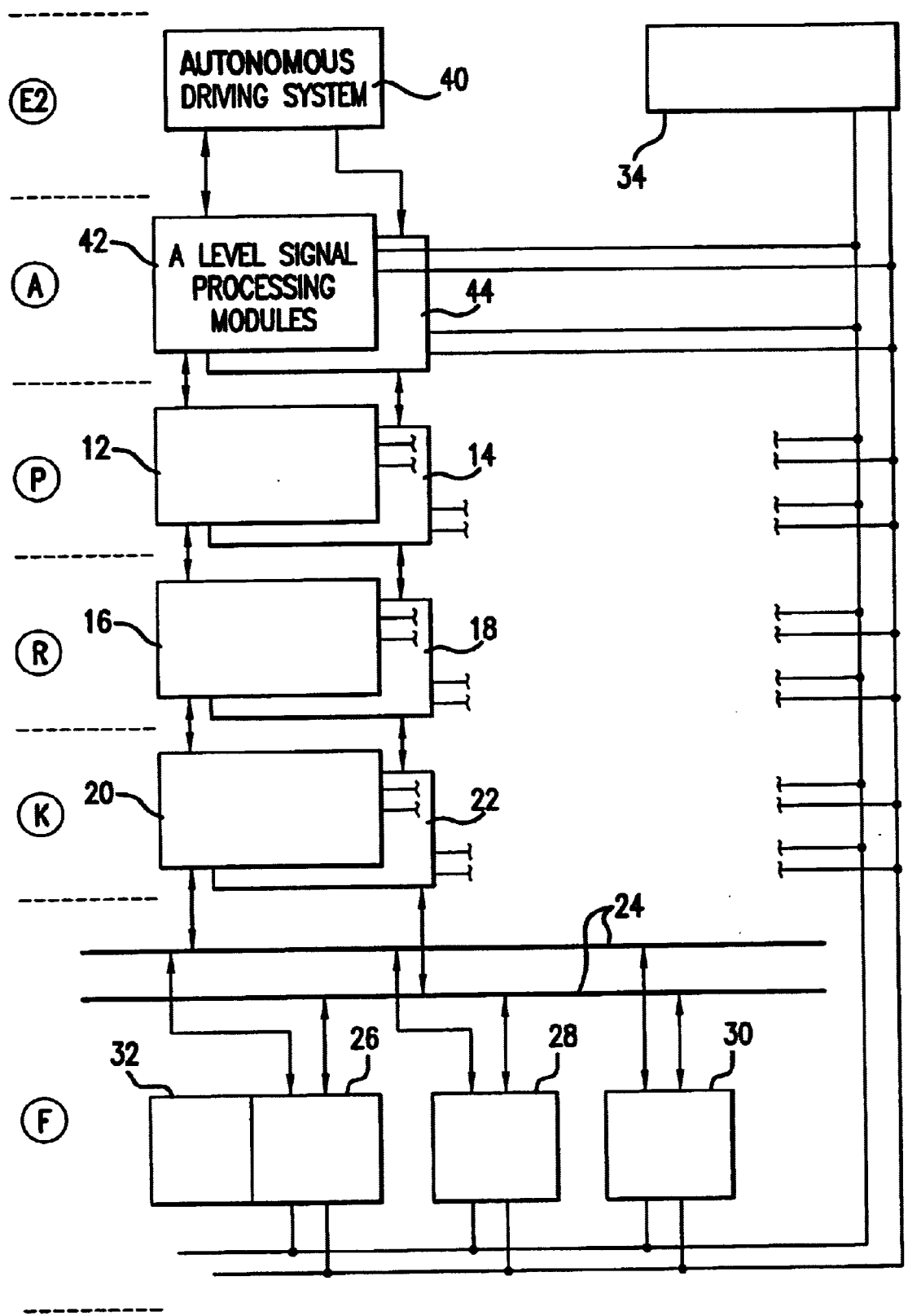
FIG. 2 shows a schematic view of a control system according to the invention in accordance with a second embodiment of the invention.

In the schematic view of the control system according to the invention for a vehicle in FIG. 1, a plurality of signal processing levels are shown. In one input level E1, a driver makes continuous stipulations for the longitudinal movement, which are converted into a setpoint value signal in the device 10. The driver stipulates, continuously over time, how the longitudinal movement of the vehicle should occur by activating operator control elements, for example side stick or accelerator pedal, brake pedal and steering wheel or else only keeping them in a specific position. In contrast to the continuous stipulation of a driver, only a one-time discrete stipulation, for example "travel from A to B", which is then executed by the vehicle control system, is made when an autonomous driving system, such as is provided in the embodiment in FIG. 2, is used.

The setpoint value signal which is generated from the continuous stipulations of the driver is fed to a predictive level P in which the setpoint value signal is corrected taking into account a prediction of driving states. A prediction of driving states is made, for example, by a predictive system, present in the vehicle, for avoiding critical driving states. Such a system issues a warning, for example, at an excessively high speed for an imminent bend or even applies the vehicle's brakes. The radius of the bend can be determined, for example, using GPS (Global Positioning System) and a roadmap, and further diagnostic signals can come from sensors for sensing the state of the road. The functions of the predictive level P are executed by the signal processing modules 12 and 14. As is apparent in FIG. 1, the setpoint value signal is fed by the device 10 to the signal processing modules 12 and 14 via separate data lines. The signal processing modules 12 and 14 are physically separate here. The signal processing then takes place in a redundant fashion both in the signal processing module 12 and in the signal processing module 14. Therefore, even when one of the modules 12 or 14 fails, the function of the predictive level P is ensured.

The setpoint value signal which is possibly corrected by the signal processing modules 12 and 14 of the predictive level P is transmitted by the modules into a reactive level R to signal processing modules 16 and 18 which are present there. In the reactive level R, system functions which react to critical driving states of the vehicle are executed. Such system functions are, for example, driving dynamics control operations which prevent the vehicle veering off at an excessively high speed on a bend.

The reactive level R then feeds the setpoint value signal which is possibly corrected there to a coordination level K and to signal processing modules 20 and 22 present there. The conversion of the setpoint value signals into actuation signals takes place in the signal processing modules 20 and 22.

These actuation signals are transmitted by the coordination level K via a fault-tolerant, redundant and bidirectional databus 24 to actuators 26, 28 and 30 which lie in an execution level F. The actuator 26 is assigned here to the vehicle brake, the actuator 28 is assigned to the steering and the actuator 30 to the engine and gearbox of the vehicle. In the execution level F, the actuation signals of the coordination level K are executed by the actuators 26, 28 and 30. In the schematic illustration in FIG. 1, in order to simplify the illustration only one actuator 30 is provided for the engine and gearbox. In fact, a plurality of actuators may be provided for the engine and gearbox, in which case actuators which are not critical for safety, for example for an engine, do not necessarily need to be connected to a redundant databus because connection to a simple databus is sufficient for actuators which are not critical for safety.

A reactive signal processing module 32, which is assigned directly to the actuator 26 which is provided for the vehicle brake, is also arranged in the execution level F. This signal processing module 32 implements the function of an antilock brake system and, in order to achieve short signalling processing times and signal transit times, it is arranged in the execution level F and assigned directly to the actuator 26.

A vehicle's electrical system 34 which is provided for supplying power to the individual levels E1, P, R, K and F is also shown in FIG. 1. The power supply is embodied redundantly here so that a high level of reliability is achieved. However, in the illustration in FIG. 1, the power supply to the individual signal processing modules 12 to 20 and to the actuators 26 to 30 is indicated only by dots which are intended to represent the continuation of the power supply lines.

The transmission of data between the signal processing modules of the predictive level P, of the reactive level R and of the coordination level K takes place in a fault-tolerant, redundant and bidirectional fashion. While setpoint value signals in FIG. 1 are transmitted from top to bottom, i.e. for example from the predictive level P to the reactive level R and the coordination level K, the actual value signals and diagnostic value signals are transmitted in the opposite direction. Actual value signals and diagnostic value signals are also transmitted via the bus 24 to the signal processing modules 20 and 22 of the coordination level K by the actuators 26, 28 and 30 arranged in the execution level F.

In this way, all the data transmissions between the levels P, R, K and F take place in a fault-tolerant, redundant and bidirectional fashion. Both electrical conductors and optical waveguides, for example glass fibre lines, can be used here for the transmission of data.

The schematic illustration in FIG. 2 shows a further inventive control system for a vehicle in which an autonomous driving system 40 stipulates discrete values, for example an instruction "travel from A to B by reference to destination coordinates". The autonomous driving system 40 thus lies in an input level E2 of the control system illustrated in FIG. 2.

The discrete stipulation of the driving system 40 is transmitted into an automation level A to signal processing modules 42 and 44. Both the signal processing module 42 and the module 44 convert the stipulation of the autonomous driving system 40 into setpoint value signals, ensuring redundant signal processing.

The rest of the structure of the control system illustrated in FIG. 2 with the levels P, R, K and F corresponds to the structure illustrated in FIG. 1 and described in relation to FIG. 1 so that further information will not be given in this respect. Elements which are illustrated in FIG. 2 and which are functionally identical to corresponding elements illustrated in FIG. 1 have been provided with the same reference symbols.

The signal processing sequence in the embodiment shown in FIG. 1 in the input level E1, the predictive level P, the reactive level R, the coordination level K and the execution level F as well as in the embodiment shown in FIG. 2 in the input level E1, the automation level A and the levels P, R, K and F is fixed and cyclical processing takes place with a fixed clock.

However, embodiments of the control system in which the reactive level R is only arranged underneath the coordination level K are possible. The correction by reference to current driving states is then carried out by processing the actuation signals generated in the coordination level K. Such a method can be advantageous with respect to a rapid reaction to current driving states because the actuation signals are corrected immediately and it is not necessary to wait first for the signal processing of the coordination level K.

The reliability of the control systems illustrated in FIGS. 1 and 2 is improved by redundant implementation of the software in the signal processing modules 12 to 20 and 42 and 44. On the one hand, the results of the signal processing can thus be checked and on the other hand the function of the control system is ensured even if there is a partial failure of the software.

What is claimed is:

1. A control system for a vehicle having a plurality of signal processing levels and actuators for brake, steering, engine and gearbox in order to convert actuation signals, said plurality of signal processing levels comprising:

one of an input level including devices for inputting continuous stipulations of a driver and for converting the stipulations into setpoint value signals and an input level including devices for inputting discrete stipulations of a driving system and an automation level with first signal processing modules for converting the stipulations of the input level into setpoint value signals;

at least one of a predictive level with second signal processing modules for correcting the setpoint value signals with reference to a prediction of driving states and a reactive level with third signal processing modules for correcting the setpoint value signal with reference to current driving states;

a coordination level with fourth signal processing modules for converting the setpoint value signals into said actuation signals;

wherein each of said actuators are connected to said fourth signal processing modules by means of a fault-tolerant, redundant and bi-directional databus, and the first, second, third and fourth signal processing modules being adapted for redundant signal processing, said system further comprising devices for fault-tolerant, redundant and bi-directional transmission of data between two successive ones of said plurality of signal processing levels.

2. The control system according to claim 1, wherein the reactive level is arranged between the coordination level and an execution level.

3. The control system according to claim 1, wherein at least one of said actuators is directly assigned a reactive signal processing module for reacting to critical, current driving states.

4. The control system according to claim 1, further comprising at least one device for supplying power for each of said signal processing levels in a redundant manner.

5. The control system according to claim 1, wherein the devices for the bidirectional transmission of data are optical waveguides.

6. The control system according to claim 1, further comprising a second set of four signal processing modules separated from said first, said second, said third and said fourth signal processing modules in order to provide redundant signal processing in each of the automation level, the predictive level, the reactive level and the coordination level.

7. The control system according to claim 6, further including software provided in said second set of signal processing modules and said first, said second, said third and said fourth signal processing modules in a redundant manner.

8. A method for controlling brakes, steering, engine and gear box of a vehicle using activation signals, comprising the steps of:

inputting one of continuous stipulations of a driver and discrete stipulations of a driving system and converting one of said continuous and discrete stipulations into setpoint value signals;

correction of at least one of the setpoint value signals with reference to one of a prediction of driving states and correction of the setpoint value signals with reference to current driving states;

conversion of said setpoint value signals into actuation signals to provide a defined interface with which levels, in which said one of said continuous and discrete stipulations are processed, are decoupled from levels in which processed stipulations are executed; and execution of the actuation signals by actuators, wherein the actuation signals are transmitted to the actuators and actual value signals and diagnostic signals are transmitted by the actuators via a databus in a fault-tolerant and redundant fashion, the conversion of the stipulations into setpoint value signals, the correction of the setpoint value signals and the conversion of the setpoint value signals into actuation signals taking place in a redundant fashion and setpoint value signals and the conversion of the setpoint value signals into actuation signals taking place in a redundant fashion and setpoint value signals, actual value signals and diagnostic signals being transmitted on common data lines in a fault-tolerant, redundant and bidirectional fashion.

* * * * *